United States Patent
Lunttila et al.

(10) Patent No.: US 10,944,515 B2
(45) Date of Patent: Mar. 9, 2021

(54) LOW LATENCY HYBRID AUTOMATIC REPEAT REQUEST (HARQ) FEEDBACK FOR WIRELESS NETWORKS

(71) Applicant: NOKIA SOLUTIONS AND NETWORKS OY, Espoo (FI)

(72) Inventors: Timo Erkki Lunttila, Espoo (FI); Esa Tapani Tiirola, Kempele (FI); Kari Juhani Hooli, Oulu (FI)

(73) Assignee: Nokia Solutions and Networks Oy, Espoo (FI)

(*) Notice: Subject to any disclaimer, the term of this patent is extended or adjusted under 35 U.S.C. 154(b) by 32 days.

(21) Appl. No.: 16/090,204

(22) PCT Filed: Apr. 1, 2016

(86) PCT No.: PCT/EP2016/057199
§ 371 (c)(1),
(2) Date: Sep. 28, 2018

(87) PCT Pub. No.: WO2017/167394
PCT Pub. Date: Oct. 5, 2017

(65) Prior Publication Data
US 2019/0116006 A1 Apr. 18, 2019

(51) Int. Cl.
*H04L 1/18* (2006.01)
*H04L 5/14* (2006.01)
*H04W 72/04* (2009.01)

(52) U.S. Cl.
CPC .......... *H04L 1/1854* (2013.01); *H04L 1/1819* (2013.01); *H04L 1/1861* (2013.01);
(Continued)

(58) Field of Classification Search
None
See application file for complete search history.

(56) References Cited

U.S. PATENT DOCUMENTS

| 10,045,339 B2 * | 8/2018 | Wei | H04W 72/0406 |
| 10,057,889 B2 * | 8/2018 | Li | H04L 1/1861 |

(Continued)

FOREIGN PATENT DOCUMENTS

| WO | 2015024423 A1 | 2/2015 |
| WO | 2015149862 A1 | 10/2015 |
| WO | 2015188886 A1 | 12/2015 |

OTHER PUBLICATIONS

International Search Report and Written Opinion for International Application No. PCT/EP2016/057199, dated Jan. 5, 2017 (10 pages).

(Continued)

*Primary Examiner* — Steve R Young
(74) *Attorney, Agent, or Firm* — Brake Hughes Bellermann LLP

(57) ABSTRACT

An example implementation includes determining, by a user device, that the user device is a low-latency mode user device; receiving a downlink data block in downlink subframe n; determining a hybrid automatic repeat request (HARQ) feedback for the data block; determining, by the low-latency mode user device, an uplink subframe n+k at a HARQ feedback offset of k subframes from subframe n, and one or more uplink HARQ resources for the uplink subframe n+k reserved for the HARQ feedback from the low-latency mode user device; and transmitting, by the low-latency mode user device, the HARQ feedback via subframe n+k and the one or more uplink HARQ resources.

16 Claims, 3 Drawing Sheets

(52) U.S. Cl.
CPC ....... *H04L 5/1469* (2013.01); *H04W 72/0413* (2013.01); *H04W 72/0446* (2013.01); *H04L 1/1812* (2013.01)

(56) References Cited

U.S. PATENT DOCUMENTS

| | | | |
|---|---|---|---|
| 10,680,761 B2* | 6/2020 | Yang | H04W 72/0446 |
| 2011/0107170 A1* | 5/2011 | Park | H04L 1/1854 |
| | | | 714/749 |
| 2013/0230017 A1* | 9/2013 | Papasakellariou | |
| | | | H04W 72/0406 |
| | | | 370/330 |
| 2015/0195822 A1* | 7/2015 | Han | H04B 5/00 |
| | | | 370/329 |
| 2017/0135096 A1* | 5/2017 | Kuchibhotla | H04W 72/0406 |
| 2018/0042015 A1* | 2/2018 | Yin | H04L 1/1861 |
| 2018/0076942 A1* | 3/2018 | Nory | H04W 52/346 |
| 2018/0359750 A1* | 12/2018 | Wei | H04W 72/0406 |

OTHER PUBLICATIONS

3GPP TSG RAN Meeting #67; RP-150465; "New SI proposal: Study on Latency reduction techniques for LTE"; Mar. 9-12, 2015; Shanghai, China; 8 pages.

3GPP TS 36113 V121.0 (Oct. 2015); LTE; Evolved Universal Terrestrial Radio Access (E-UTRA); Physical layer procedures (Release 12); Oct. 2015; Sophia Antipolis, France; 243 pages.

Harri Holma and Antti Toskala; LTE for UMTS—OFDMA and SC-FDMA Based Radio Access; John Wiley & Sons, Ltd., 2009; pp. 97-100.

Office Action for European Application No. 16712931.1, dated Apr. 3, 2020, 4 pages.

Office Action for Chinese Patent Application No. 201680082999.6, dated Aug. 3, 2020, 12 pages.

* cited by examiner

LOW LATENCY HYBRID AUTOMATIC REPEAT REQUEST (HARQ) FEEDBACK FOR WIRELESS NETWORKS

CROSS-REFERENCE TO RELATED APPLICATIONS

This application is a national stage entry of PCT Application No. PCT/EP2016/057199 filed Apr. 1, 2016, entitled "LOW LATENCY HYBRID AUTOMATIC REPEAT REQUEST (HARD) FEEDBACK FOR WIRELESS NETWORKS" which is hereby incorporated by reference in its entirety.

TECHNICAL FIELD

This description relates to communications, and in particular, to a use of a low latency hybrid automatic repeat request (HARQ) feedback for wireless networks.

BACKGROUND

A communication system may be a facility that enables communication between two or more nodes or devices, such as fixed or mobile communication devices. Signals can be carried on wired or wireless carriers.

An example of a cellular communication system is an architecture that is being standardized by the 3rd Generation Partnership Project (3GPP). A recent development in this field is often referred to as the long-term evolution (LTE) of the Universal Mobile Telecommunications System (UMTS) radio-access technology. E-UTRA (evolved UMTS Terrestrial Radio Access) is the air interface of 3GPP's Long Term Evolution (LTE) upgrade path for mobile networks. In LTE, base stations or access points (APs), which are referred to as enhanced Node AP (eNBs), provide wireless access within a coverage area or cell. In LTE, mobile devices, or mobile stations are referred to as user equipments (UE). LTE has included a number of improvements or developments.

Many modern communication systems, including LTE, employ a combination of forward error correction coding and ARQ (automatic repeat request), known as hybrid ARQ (HARQ). HARQ uses forward error correction (FEC) codes to correct a subset of errors and relies on error detection to detect uncorrectable errors. Erroneously received packets are discarded and the receiver requests a retransmission of the corrupted packet(s) by sending a negative acknowledgement (NAK) to the transmitter. This is a combination of FEC and ARQ. A version of the original packet is then retransmitted, and the receiver may combine multiple received versions of the packet. The receiver may also send an acknowledgement (ACK) for correctly received (decoded) packets. HARQ feedback may include either an ACK or a NAK.

SUMMARY

According to an example implementation, a method may include determining, by a user device, that the user device is a low-latency mode user device; receiving a downlink data block in downlink subframe n; determining a hybrid automatic repeat request (HARQ) feedback for the data block; determining, by the low-latency mode user device, an uplink subframe n+k at a HARQ feedback offset of k subframes from subframe n, and one or more uplink HARQ resources for the uplink subframe n+k reserved for the HARQ feedback from the low-latency mode user device; and transmitting, by the low-latency mode user device, the HARQ feedback via subframe n+k and the one or more uplink HARQ resources.

According to an example implementation, an apparatus includes at least one processor and at least one memory including computer instructions, when executed by the at least one processor, cause the apparatus to: determine, by a user device, that the user device is a low-latency mode user device; receive a downlink data block in downlink subframe n; determine a hybrid automatic repeat request (HARQ) feedback for the data block; determine, by the low-latency mode user device, an uplink subframe n+k at a HARQ feedback offset of k subframes from subframe n, and one or more uplink HARQ resources for the uplink subframe n+k reserved for the HARQ feedback from the low-latency mode user device; and transmit, by the low-latency mode user device, the HARQ feedback via subframe n+k and the one or more uplink HARQ resources.

According to an example implementation, an apparatus includes means for determining, by a user device, that the user device is a low-latency mode user device; means for receiving a downlink data block in downlink subframe n; means for determining a hybrid automatic repeat request (HARQ) feedback for the data block; means for determining, by the low-latency mode user device, an uplink subframe n+k at a HARQ feedback offset of k subframes from subframe n, and one or more uplink HARQ resources for the uplink subframe n+k reserved for the HARQ feedback from the low-latency mode user device; and means for transmitting, by the low-latency mode user device, the HARQ feedback via subframe n+k and the one or more uplink HARQ resources.

According to an example implementation, a computer program product includes a computer-readable storage medium and storing executable code that, when executed by at least one data processing apparatus, is configured to cause the at least one data processing apparatus to perform a method including: determining, by a user device, that the user device is a low-latency mode user device; receiving a downlink data block in downlink subframe n; determining a hybrid automatic repeat request (HARQ) feedback for the data block; determining, by the low-latency mode user device, an uplink subframe n+k at a HARQ feedback offset of k subframes from subframe n, and one or more uplink HARQ resources for the uplink subframe n+k reserved for the HARQ feedback from the low-latency mode user device; and transmitting, by the low-latency mode user device, the HARQ feedback via subframe n+k and the one or more uplink HARQ resources.

The details of one or more examples of implementations are set forth in the accompanying drawings and the description below. Other features will be apparent from the description and drawings, and from the claims.

DETAILED DESCRIPTION

Figure 1:
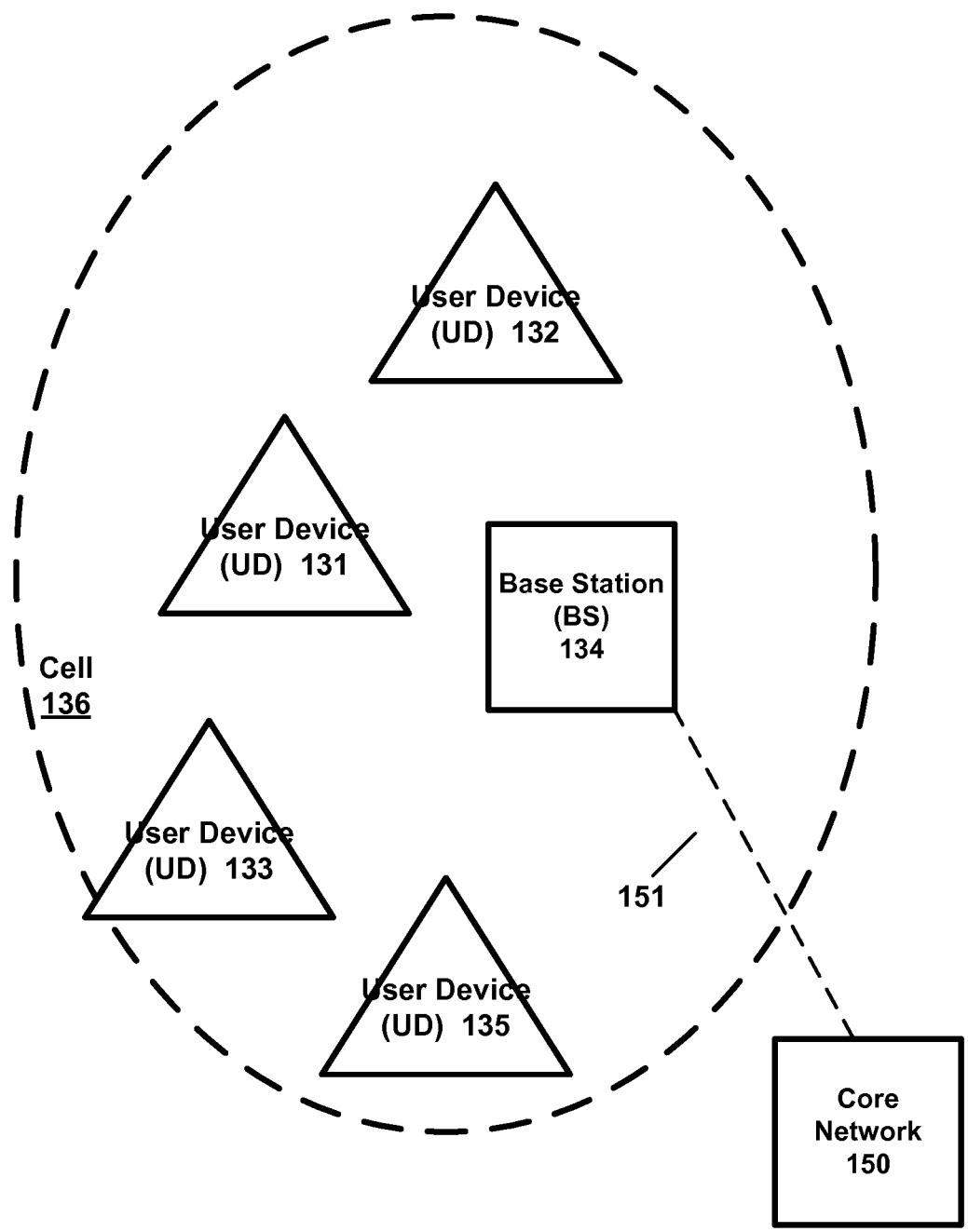
FIG. 1 is a block diagram of a wireless network according to an example implementation.

FIG. 1 is a block diagram of a wireless network 130 according to an example implementation. In the wireless network 130 of FIG. 1, user devices 131, 132, 133 and 135, which may also be referred to as mobile stations (MSs) or user equipment (UEs), may be connected (and in communication) with a base station (BS) 134, which may also be referred to as an access point (AP), an enhanced Node B (eNB) or a network node. At least part of the functionalities of an access point (AP), base station (BS) or (e)Node B (eNB) may be also be carried out by any node, server or host which may be operably coupled to a transceiver, such as a remote radio head. BS (or AP) 134 provides wireless coverage within a cell 136, including to user devices 131, 132, 133 and 135. Although only four user devices are shown as being connected or attached to BS 134, any number of user devices may be provided. BS 134 is also connected to a core network 150 via a S1 interface 151. This is merely one simple example of a wireless network, and others may be used.

A user device (user terminal, user equipment (UE)) may refer to a portable computing device that includes wireless mobile communication devices operating with or without a subscriber identification module (SIM), including, but not limited to, the following types of devices: a mobile station (MS), a mobile phone, a cell phone, a smartphone, a personal digital assistant (PDA), a handset, a device using a wireless modem (alarm or measurement device, etc.), a laptop and/or touch screen computer, a tablet, a phablet, a game console, a notebook, and a multimedia device, as examples. It should be appreciated that a user device may also be a nearly exclusive uplink only device, of which an example is a camera or video camera loading images or video clips to a network.

In LTE (as an example), core network 150 may be referred to as Evolved Packet Core (EPC), which may include a mobility management entity (MME) which may handle or assist with mobility/handover of user devices between BSs, one or more gateways that may forward data and control signals between the BSs and packet data networks or the Internet, and other control functions or blocks.

The various example implementations may be applied to a wide variety of wireless technologies or wireless networks, such as LTE, LTE-A, LTE-A Pro, 5G, cmWave, and/or mmWave band networks, or any other wireless network. LTE, 5G, cmWave and mmWave band networks are provided only as illustrative examples, and the various example implementations may be applied to any wireless technology/wireless network. LTE supports both frequency division duplexing (FDD) and time division duplexing (TDD) modes. One of the scenarios considered here is LTE-Advanced Pro system, operating in TDD mode, and configured to support reduced latency (compared to Release 8 LTE TDD operation).

According to an example implementation, the wireless network in FIG. 1 may employ a combination of forward error correction coding and ARQ (automatic repeat request), referred to as hybrid ARQ (HARQ). With such an approach, for example for data transmission in the downlink direction, BS 134 (as an example transmitter) may transmit a packet or data block to user device 132, for example. User device 132 (as an example receiver) may use forward error correction (FEC) codes to correct errors in the received data block, where possible. User device 132 may use error detection to detect uncorrectable errors. If the received data block cannot be decoded by user device 132 due to errors, user device may send a negative acknowledgement (NAK) for the packet to the BS 134. In response to receiving the NAK, BS 134 may resend (retransmit) the data block or packet or a redundancy version of the data block to the user device 132.

User device 132 may combine multiple received versions of the data block to decode the data block, which may sometimes be referred to as soft combining. User device 132 may then send an acknowledgement (ACK) for the packet to BS 134 to acknowledge that the data block was received and decoded. A similar process may be followed for uplink data transmission, where the user device 132 may send data to the BS 134. The ACK/NAK feedback may be referred to as HARQ feedback.

The HARQ feedback offset is the delay (or latency) in subframes (or in ms) from transmission of the data block until transmission of the HARQ feedback (e.g., ACK or NAK). In some example implementations of normal-latency mode user devices, HARQ feedback offset may vary between 4 ms (or 4 subframes) and 13 ms (or 13 subframes) for time-division duplex (TDD) operation of normal-latency mode user devices, e.g., with a transmission time interval (TTI) for each subframe being 1 ms, for example. And, for example, for normal-latency mode user devices, a HARQ feedback offset may be 4 ms (or 4 subframes) for frequency-division duplex operation.

According to an example implementation, a shorter HARQ feedback offset (or latency) may be accomplished (or provided) for low-latency mode user devices, e.g., using a HARQ feedback offset of, e.g., either 1 ms (or 1 subframe), 2 ms (or 2 subframes), and/or 3 ms (or 3 subframes), which are each a shorter than the HARQ feedback offset used for normal-latency mode user devices (e.g., at least 4 ms/4 subframes). In an example implementation, the shorter HARQ feedback offset for low-latency mode user devices may be accomplished without changing the TTI length of subframes. The shorter HARQ feedback offset for low-latency mode user devices may be accomplished by defining a new timing (e.g., HARQ feedback is sent 1 or more subframes earlier than the 4 subframe HARQ feedback offset used for normal-latency mode user devices), and by allocating, at least for some subframes, HARQ feedback resources for low-latency mode user devices that do not conflict with HARQ feedback resources for normal-latency mode user devices.

In an example implementation, a user device operating in a low-latency mode may be referred to as a low-latency mode user device, while a user device operating in a normal-latency mode may be referred to a normal-latency mode user device. In an example implementation, at least some user devices may be able to switch operating modes between normal-latency mode and low-latency mode. Thus, for example, a low-latency mode user device (e.g., a user device operating in a low-latency mode) may switch to a normal-latency mode. Similarly, a normal-latency mode user device (e.g., a user device operating in a normal-latency mode) may switch to a low-latency mode.

One example implementation may provide completely different HARQ resource spaces for sending HARQ feedback, e.g., including a first set of HARQ resources for low-latency mode user devices, and a second set of resources (different from the first set of HARQ resources) for normal-latency mode user devices. However, at least in some situations, allocating completely different sets of HARQ resources for low-latency mode user devices and normal-latency mode user devices may be an inefficient use of resources. Therefore, rather than providing completely separate HARQ feedback resource spaces for low-latency mode and normal-latency mode user devices, there may be some situations in which a shared set of HARQ resources may be shared by low-latency mode user devices and normal-latency mode user devices, as described in greater detail below.

According to an example implementation, a low-latency mode user device may use a HARQ feedback offset of k subframes (e.g., which may be 1 subframe, 2 subframes or 3 subframes, as some examples). Thus, in response to receiving a data block in subframe n, the low-latency mode user device may send HARQ feedback at subframe n+k (which is k subframes after the transmission of the downlink data block at subframe n, since subframe n+k is the first uplink subframe that meets the minimum HARQ feedback offset of k subframes). The minimum HARQ feedback offset value, may be a parameter defined by the specification for a low-latency mode user device. For example, it may be defined that $k \geq 2$. It may be also a parameter defined separately for different user device categories.

In addition to selecting an uplink subframe (e.g., subframe n+k) for HARQ feedback, the low-latency mode user device will also select or determine one or more uplink HARQ resources (e.g., on a physical uplink control channel/PUCCH) to send the HARQ feedback to the BS. This one or more uplink HARQ resources for uplink subframe n+k for the low-latency mode user device may either be:

1) A different set of uplink HARQ resources that is different from any uplink HARQ resources reserved (for uplink subframe n+k) for HARQ feedback from a normal-latency mode user device, e.g., in the situation where the low-latency mode user device and the normal-mode have different HARQ feedback offsets for the HARQ feedback in subframe n+k. According to an example implementation, this may be because the BS may not typically assign different uplink HARQ resources in a subframe to different user devices where such user devices have different HARQ feedback offsets (hence the need or desirability to allocate separate or different HARQ resources to the two user devices in such a situation, because otherwise the user devices, having different HARQ feedback offsets, may typically collide or have a conflict when attempting to send HARQ feedback via a possibly same HARQ resource); or, 2) A shared set of uplink HARQ resources that are shared by both the low-latency mode user device and the normal-latency mode user device to send HARQ feedback in uplink subframe n+k (for example) in the situation where both the low-latency mode user device and the normal-latency mode user device have a same HARQ feedback offset for the HARQ feedback transmitted via subframe n+k. According to an example implementation, a shared set of HARQ resources may be used in this situation because the BS may typically assign different uplink HARQ resources (e.g., from the shared HARQ resources) in a subframe to different user devices where such user devices have the same HARQ feedback offset (hence there may typically be no need to allocate separate or different HARQ resources to the two user devices in such a situation, where the user devices have the same HARQ feedback offset).

Figure 2:
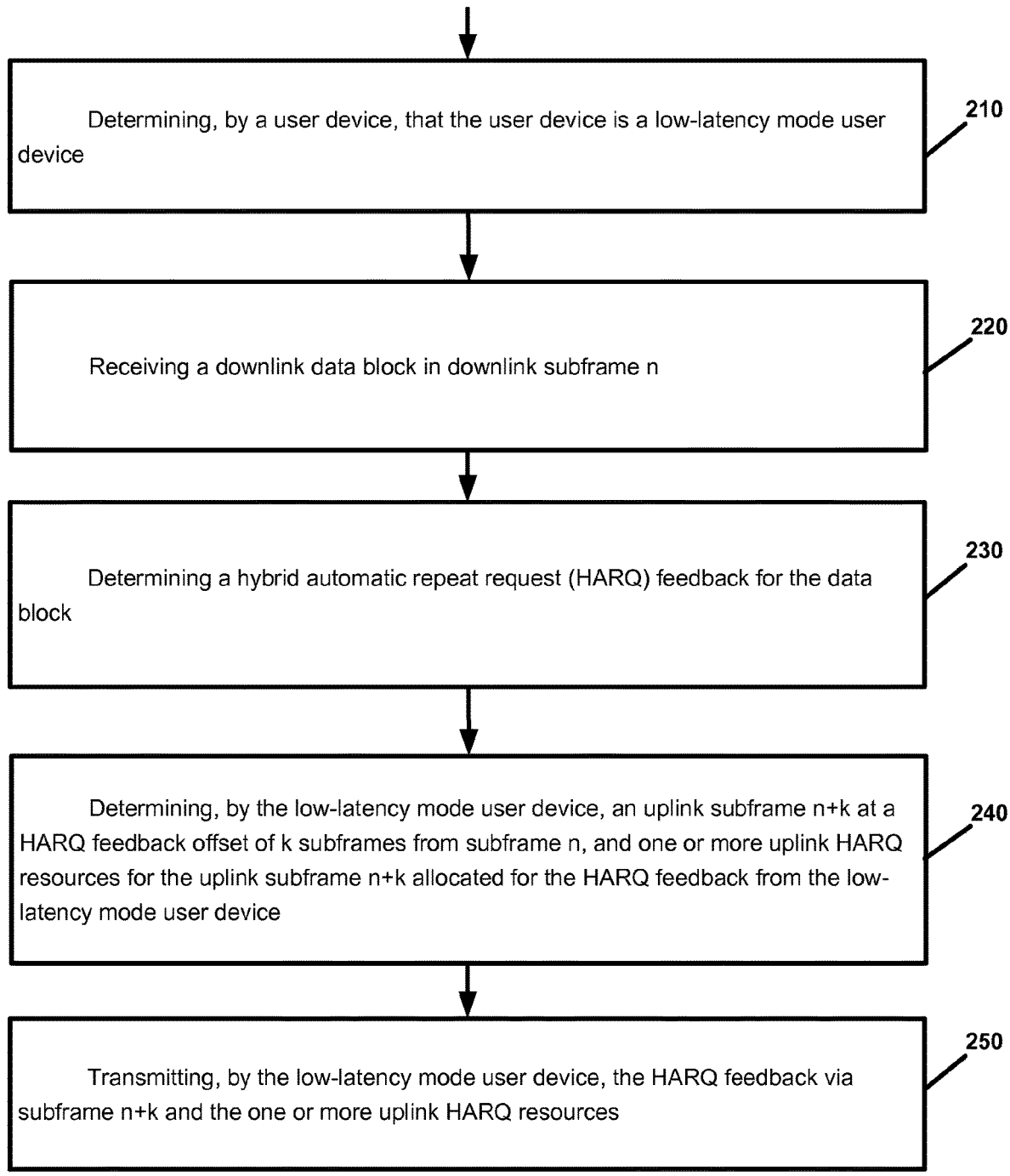
FIG. 2 is a flow chart illustrating operation of a low-latency mode user device according to an example implementation.

FIG. 2 is a flow chart illustrating operation of a low-latency mode user device according to an example implementation. Operation 210 includes determining, by a user device, that the user device is a low-latency mode user device. Operation 220 includes receiving a downlink data block in downlink subframe n. Operation 230 includes determining a hybrid automatic repeat request (HARQ) feedback (e.g., ACK or NAK) for the data block. Operation 240 includes determining, by the low-latency mode user device, an uplink subframe n+k at a HARQ feedback offset of k subframes from subframe n, and one or more uplink HARQ resources for the uplink subframe n+k reserved for the HARQ feedback from the low-latency mode user device. And, operation 250 may include transmitting, by the low-latency mode user device, the HARQ feedback via subframe n+k and the one or more uplink HARQ resources.

According to an example implementation of the method of FIG. 2, the method may further include determining that one or more first uplink HARQ resources for uplink subframe n+k have been reserved for HARQ feedback from a normal-latency mode user device for a downlink data block having a HARQ feedback offset that is different than k subframes; wherein the determining one or more uplink HARQ resources for the uplink subframe n+k reserved for the HARQ feedback from the low-latency mode user device comprises determining one or more second uplink HARQ resources reserved for the HARQ feedback from the low-latency mode user device, wherein the one or more second uplink HARQ resources are different from the one or more first uplink HARQ resources based on a use of a same HARQ feedback offset for both the low-latency mode user device and the normal-latency mode user device.

According to an example implementation of the method of FIG. 2, the method may further include determining that one or more first uplink HARQ resources for uplink subframe n+k have been reserved for HARQ feedback from a normal-latency mode user device for a downlink data block having a HARQ feedback offset that is different than k subframes; and wherein one or more HARQ resources for the low-latency mode user device are mapped to physical uplink control channel (PUCCH) resources with highest indices, starting after the highest indexed HARQ resources mapped to the normal-latency mode user device.

According to an example implementation of the method of FIG. 2, the method may further include determining that one or more first uplink HARQ resources for uplink subframe n+k have been reserved for HARQ feedback from a normal-latency mode user device for a downlink data subframe having a HARQ feedback offset that is also k subframes; and, determining the one or more first uplink HARQ resources reserved for the HARQ feedback from the low-latency mode user device, wherein the one or more first HARQ resources are shared for HARQ feedback from both the low-latency mode user device and the normal-latency mode user device based on a use of different HARQ feedback offsets for the low-latency mode user device and the normal-latency mode user device.

According to an example implementation of the method of FIG. 2, the HARQ feedback offset of k subframes for the low-latency mode user device is less than a minimum HARQ feedback offset of one or more normal-latency mode user devices.

According to an example implementation of the method of FIG. 2, the HARQ resources may include resources reserved in a physical uplink control channel (PUCCH) for HARQ feedback.

According to an example implementation of the method of FIG. 2, the determining, by the low-latency mode user device, an uplink subframe n+k at a HARQ feedback offset of k subframes may include: determining, by the low-latency mode user device, an uplink subframe n+k at a HARQ feedback offset that satisfies the minimum HARQ feedback offset for the low-latency mode user device from the downlink subframe n.

According to an example implementation of the method of FIG. 2, the feedback offset of k subframes for the low-latency mode user device is defined to be at least one of the following: k greater than or equal to 1 subframe; k greater than or equal to 2 subframes; and k greater than or equal to 3 subframes. Further example details of various example implementations are described below.

According to an example implementation, the uplink HARQ resources may be reserved on a physical uplink control channel (PUCCH), where, for example, PUCCH HARQ resources (for sending HARQ ACK or NAK) may be implicitly determined based on the lowest control channel element (CCE) of the corresponding physical downlink control channel (PDCCH) which is used for scheduling the downlink data block and semi-statically configured PUCCH Format 1/1a/1b starting position/index. Furthermore, in TDD mode there may be a separate timing offset defined as a function of SIB-1 (system information block-1)-signalled uplink-downlink (UL-DL) configuration and the subframe index. The UL-DL configuration indicates which subframes are uplink (UL) and which subframes are downlink (DL).

With respect to normal-latency mode user devices, the HARQ-ACK resource may be implicitly determined from the corresponding physical resource indices. For example, the first CCE index of PDCCH (physical downlink control channel) is used to determine the DL HARQ resource, along with index of the DL subframe and the index of the OFDM (orthogonal frequency division multiplex) symbol carrying the CCE and some higher layer configured parameters. An issue in PUCCH format 1a/1b resource allocation for TDD is that more than one DL subframe may be associated with a single UL subframe. As shown in Table 1, the HARQ feedback (ACK or NAK) corresponding to M (could be 1, 2, 3, 4, 9) DL subframes are reported in one UL subframe.

back for DL subframe n−7, then for DL subframe n−6). In other words, Table 1 illustrates the HARQ feedback offset or delay (in terms of milliseconds) associated with each DL subframe. As can be seen the delay ranges from 4 ms up to 13 ms.

For PDCCH (physical downlink control channel) in Rel-8/9/10/11/12 TDD operation, PUCCH resources corresponding to multiple DL subframes are concatenated and interleaved in the associated UL subframe (e.g., with 40 CCEs per DL subframe and M=2, 80 PUCCH resources are reserved), so that there are no resource collisions between different subframes. To be specific, the PDCCH resources corresponding to PDCCH OFDM symbols [s1, s2, s3 . . . ] and subframes [SF1, SF2, SF3, . . . ] may be mapped to PUCCH resources in the following order:

SF1-s1 (e.g., the first index listed under the subframe and UL-DL configuration, such as index=8)
SF2-s1 (e.g., second listed index, such as index=7)
SF3-s1 (third listed index such as index=4
SF4-s1 (fourth listed index such as index=6)
SF1-s2 (index=8)
SF2-s2 (index=7)
SF3-s2 (index=4)
SF4-s2 (index=6)
. . .

Thus, for example, as shown above, with reference to Table 1, for UL-DL configuration 2, and for subframe 2, the order of the indices are: 8, 7, 4, 6.

As noted above, according to an example implementation, HARQ feedback offset (or HARQ latency) can be reduced without changing the length of the TTI. According to an example implementation, a minimum HARQ feedback off-

TABLE 1

Downlink association set index K: $\{k_0, k_1, \ldots k_{M-1}\}$ for TDD [TS 36.213]

| UL-DL Configuration | Subframe n | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | — | 4 | — | — | 6 | — | 4 |
| 1 | — | — | 7, 6 | 4 | — | — | — | 7, 6 | 4 | — |
| 2 | — | — | 8, 7, 4, 6 | — | — | — | — | 8, 7, 4, 6 | — | — |
| 3 | — | — | 7, 6, 11 | 6, 5 | 5, 4 | — | — | — | — | — |
| 4 | — | — | 12, 8, 7, 11 | 6, 5, 4, 7 | — | — | — | — | — | — |
| 5 | — | — | 13, 12, 9, 8, 7, 5, 4, 11, 6 | — | — | — | — | — | — | — |
| 6 | — | — | 7 | 7 | 5 | — | — | 7 | 7 | — |

When considering HARQ-ACK resource allocation for PUCCH, it may be useful to understand the concept of Downlink association set depicted in Table 1. The DL association set defines for each UL subframe n the timing and the order in which the HARQ feedback for each DL/Special subframe is transmitted. E.g. with UL-DL configuration #0, in UL subframe #n=2 the PUCCH may carry the HARQ feedback (ACK or NAK) for DL subframe which was transmitted 6 subframes earlier, i.e., the HARQ feedback offset (HARQ delay) in this case is 6 subframes. Similarly, for UL-DL configuration 1, in UL subframe #2 the HARQ feedback may be signalled for DL subframes that were sent 7, or 6 subframes earlier, and the PUCCH resources are filled in this specific order (first HARQ feedset (or HARQ delay) of 2 ms or 3 ms may be provided. Based on this approach, Tables 2 and 3 list the Downlink Association set for minimum latency (or minimum HARQ feedback offset) of 3 ms and 2 ms, respectively, the for each DL PDSCH (physical downlink shared data channel) transmission, according to an example implementation. Thus, for Table 2 (3 ms minimum latency), the HARQ feedback resources for low-latency mode user devices might (according to this example) be allocated (or reserved) in the order of 3, 4, 6 and 7, for subframe 2, UL-DL configuration 2. The numbers 3, 4, 6 and 7 refer to uplink HARQ resources being provided for downlink data blocks transmitted n−3 subframes earlier, n−4 subframes earlier, n−6 subframes earlier and n−7 subframes earlier, respectively.

TABLE 2

3 ms minimum latency

| UL-DL Configuration | Subframe n | | | | | | | | | |
|---|---|---|---|---|---|---|---|---|---|---|
| | 0 | 1 | 2 | 3 | 4 | 5 | 6 | 7 | 8 | 9 |
| 0 | — | — | — | 3 | 3 | — | — | — | 3 | 4 |
| 1 | — | — | 3, 6 | 3 | — | — | — | 3, 6 | 3 | — |
| 2 | — | — | 3, 4, 6, 7 | — | — | — | — | 3, 4, 6, 7 | — | — |
| 3 | — | — | 3, 4, 5, 6, 7 | 3 | 3 | — | — | — | — | — |
| 4 | — | — | 3, 4, 5, 6, 7, 8, 11 | 3 | — | — | — | — | — | — |
| 5 | — | — | 3, 4, 5, 6, 7, 8, 9, 11, 12 | — | — | — | — | — | — | — |
| 6 | — | — | 3, 6 | 3 | 3 | — | — | — | 3 | — |

TABLE 3

2 ms minimum latency

| UL-DL Configuration | Subframe n | | | | | | | | | |
|---|---|---|---|---|---|---|---|---|---|---|
| | 0 | 1 | 2 | 3 | 4 | 5 | 6 | 7 | 8 | 9 |
| 0 | — | — | 2 | 2 | — | — | — | 2 | 2 | — |
| 1 | — | — | 2, 3 | 2 | — | — | — | 2, 3 | 2 | — |
| 2 | — | — | 2, 3, 4, 6 | — | — | — | — | 2, 3, 4, 6 | — | — |
| 3 | — | — | 2, 3, 4, 5, 6, 7 | 2 | — | — | — | — | — | — |
| 4 | — | — | 2, 3, 4, 5, 6, 7, 8 | 2 | — | — | — | — | — | — |
| 5 | — | — | 2, 3, 4, 5, 6, 7, 8, 9, 11 | — | — | — | — | — | — | — |
| 6 | — | — | 2, 3 | 2 | — | — | — | 2 | 2 | — |

From the Tables 1-3 the improvement achievable for average HARQ latency assuming minimum HARQ feedback delay of 3 ms or 2 ms, respectively. Some examples are shown below:

UL-DL Configuration 1:
Average latency, legacy=5.67 ms
Average latency (n+3)=3.83 ms=−32.3%
Average latency (n+2)=2.33 ms=−58.8%
UL-DL Configuration 2:
Average latency, legacy=(8+7+4+6+8+7+4+6)/8=6.25 ms
Average latency (n+3)=(3+4+6+7+3+4+6+7)/8=5 ms=−20%
Average latency (n+2)=(2+3+4+6+2+3+4+6)/8=3.75 ms=−40%
UL-DL Configuration 3:
Average latency, legacy=6.28 ms
Average latency (n+3)=4.43 ms=−29.5%
Average latency (n+2)=4.14 ms=−34.1%

According to an example implementation, combining the operation of a normal-latency mode user device (see Table 1) with the operation of a low-latency mode user device with HARQ feedback offset of 3 ms (Table 2), this may, at least in some cases, result in a collision of the uplink HARQ (PUCCH) resources used by the normal-latency mode user device and the low-latency mode user device, e.g., based on the mapping between the physical resource index and HARQ-ACK resource between low-latency mode user devices and normal-latency mode user devices. As an example, for e.g. UL-DL configuration #2 and subframe n=2:

A normal-latency (legacy) mode user device would allocate PUCCH resources for HARQ feedback in the following order: 8, 7, 4, 6
    PDSCH corresponding to PDCCH transmitted in Subframe n−8, OFDM symbol #1
    PDSCH corresponding to PDCCH transmitted in Subframe n−7, OFDM symbol #1
    PDSCH corresponding to PDCCH transmitted in Subframe n−4, OFDM symbol #1
    PDSCH corresponding to PDCCH transmitted in Subframe n−6, OFDM symbol #1
    PDSCH corresponding to PDCCH transmitted in Subframe n−8, OFDM symbol #2
. . .

On the other hand, a low-latency mode user device following e.g. Table 2 (3 ms minimum HARQ latency) would allocate PUCCH resources in the following order: 3, 4, 6, 7
    PDSCH corresponding to PDCCH transmitted in Subframe n−3, OFDM symbol #1
    PDSCH corresponding to PDCCH transmitted in Subframe n−4, OFDM symbol #1
    PDSCH corresponding to PDCCH transmitted in Subframe n−6, OFDM symbol #1
    PDSCH corresponding to PDCCH transmitted in Subframe n−7, OFDM symbol #1
    PDSCH corresponding to PDCCH transmitted in Subframe n−3, OFDM symbol #2

In other words, there would be potentially collisions of HARQ feedback (ACK/NAK) transmissions/resources. For example, HARQ feedback corresponding to subframe n−8 for normal-latency mode user devices and subframe n−3 for low-latency mode user devices would occupy the same PUCCH (HARQ) resources. Similarly, HARQ feedback corresponding to subframe n−7 for normal-latency mode user devices and subframe n−4 for low-latency mode user devices would occupy or use the same PUCCH (HARQ) resources. These are a couple of examples of where a collision or conflict in uplink HARQ (PUCCH) resources may occur between low-latency mode user devices (e.g., Table 2) and normal-latency mode user devices (e.g., Table 1).

According to an example implementation, a mapping rule is provided for the HARQ feedback corresponding to different DL subframes for low-latency mode user. According to an example implementation, a new Downlink association set index tables (Tables 4 and 5) for user devices that are configured in a low-latency mode should follow (e.g., instead of the existing Table 1).

In the following we consider how to define such tables:

Three different UL subframe types carrying HARQ feedback may be considered or defined (see Table 2 and Table 3 in the implementation section)
1. UL Subframes with HARQ feedback only from low-latency mode user devices
2. UL Subframes with HARQ feedback from both low-latency mode user devices and normal-latency mode user devices UEs
3. UL Subframes with HARQ feedback only from normal-latency mode user devices (this has already been considered, e.g., see Table 1)

In an example implementation, PUCCH (uplink HARQ) resource determination for Type 1 (only low-latency mode) subframes is different from PUCCH for Type 2/3 (including both normal-latency mode and low-latency mode) subframes:

Separate configuration for cell-specific parameters (e.g. no PUCCH format 2 region at all→no periodic signals). All periodic signals are handled by normal-latency mode PUCCH. For Type 1 subframes, CQI information does not need to be transmitted as often, so the format 2 region (e.g., at the spectrum edge) of the UL subframe (used for CQI for normal-latency mode user devices for CQI reporting) can be reallocated and used by the Type 1 (low-latency mode) subframes for HARQ resources from low-latency mode user devices.

The presence of any PUCCH in Type 1 subframes may depend on PDSCH scheduling for the low-latency mode user devices on the corresponding subframes (defined by the DL association table).

According to an example implementation, operation may include one or more (or all) of the following operations/steps:
a) Determining whether the user device is operating in the normal-latency mode or low-latency mode
b) receiving a DL transport block in subframe n and determining the corresponding HARQ feedback (ACK or NAK),
c) based on a) and b) determining the UL subframe and UL PUCCH/HARQ resource to be used to transmit HARQ feedback to the BS, and
d) transmitting the HARQ feedback in the determined UL subframe and the UL PUCCH/HARQ resource Example details of the above steps/operations a)-d) are described in the following:

a) Determining whether the user device is operating in the normal or reduced latency mode:

this may depend e.g. on a RRC (radio resource control) configuration (reduced latency mode may be semi-statically configured for the user device/UE)

alternatively or additionally, mode may be determined dynamically depending on which PDCCH (physical downlink control channel) DCI (downlink control information) format or search space is used for scheduling the given DL transmission.

When the UE is operating in the low (or reduced) latency mode the UL subframe to be used to send HARQ feedback may be the first UL subframe following the DL subframe n satisfying the a predefined condition the predefined condition is that the index of the UL subframe is at least n+2 or n+3 (e.g., the first UL subframe meeting the HARQ feedback offset/minimum latency)

c) Determining the UL (PUCCH) resource: (according to one illustrative example implementation):

when the determined UL subframe for HARQ feedback for low-latency mode is such that it also includes PUCCH resources for HARQ feedback for normal latency mode, the HARQ feedback for low-latency mode may be mapped onto the PUCCH resources with highest indices, starting from the highest indexed normal latency mode PUCCH resource.

when the determined UL subframe for HARQ feedback for low-latency mode is such that it does not also include PUCCH resources for HARQ feedback for normal-latency mode, the HARQ feedback for low (or reduced)-latency mode are mapped onto the PUCCH resources starting from a RRC (radio resource control configured, or network configured) PUCCH resource (denoted as N_lowlatPUCCH)

According to an example implementation, an implicit PUCCH HARQ feedback resource allocation for Type 2 UL subframes (including HARQ feedback from both low-latency mode and normal-latency mode user devices), and in particular, the downlink association set(s) for the low-latency mode user devices so that it takes into account the normal-latency subframe timing, and avoids collisions in resource allocation by appropriate mapping and indexing of subframes. This, for example, may be achieved by defining two groups of Downlink subframes for each Type 2 (UL) subframe n (see Table 4 and Table 5):

Group 1: First group includes the DL subframes in the normal-latency mode DL association set. This first group of subframes can be further divided into two groups Group 1A: DL subframes that are associated with the same UL subframe both in the case of normal-latency mode user devices as well as low-latency mode user devices. These subframes are illustrated as plain numbers in Tables 4/5 (with no parentheses ( ) or brackets [ ]). PUCCH resources for these DL subframes are (or may be) shared between normal-latency mode user devices and low-latency UEs. (e.g., because this group of DL subframes have the same HARQ feedback offset for both normal-latency mode user devices and low-latency mode user devices, and hence, a base station may typically assign a different PUCCH/HARQ resources for these two different user devices, so in this case, typically no HARQ/PUCCH resource conflict would occur between the low-latency mode user device and the normal-latency mode user device in this situation).

Group 1B: DL subframes with which low latency mode user devices are not associated. These are illustrated as numbers in parentheses ( ) in Tables 4/5. From low latency user device's point of view, the corresponding subframes can be seen as PUCCH resources occupied by normal-latency mode user devices.

Subframe association order of this group corresponds to that of DL association set for normal-latency mode user devices.

Group 2: The second group (group 2) includes the DL subframes, with which only user devices in low latency mode are associated. These are illustrated with numbers in brackets [ ], as shown in Table 4/5. Subframe association order of this group may be defined according a predefined logic, or a predefined order. For example, beginning with the highest offset values.

Thus, in Tables 4 and 5:
- numbers without parentheses or brackets: for both (or shared by both) low-latency and normal-latency mode user devices
- numbers in parentheses ( ) for normal-latency mode user devices
- numbers in brackets [ ]: for low-latency mode user devices compared to Table 1) from perspective of normal-latency mode user device (PUCCH/HARQ resources are still assigned in the order 8, 7, 4, 6). The PUCCH/HARQ resources assigned for DL subframes n−4 and n−6 are shared by both the low-latency mode user device and the normal-mode user device due to same HARQ feedback offsets for these downlink subframes for both the normal-latency mode and low-latency mode user devices (e.g., the BS will assign, within the PUCCH, different resources (e.g., different CCEs or different subcarriers) within each set of resources assigned to a subframe for HARQ feedback. After PUCCH/

TABLE 4

3 ms minimum latency

| UL-DL Configuration | Subframe n | | | | | | | | | |
|---|---|---|---|---|---|---|---|---|---|---|
| | 0 | 1 | 2 | 3 | 4 | 5 | 6 | 7 | 8 | 9 |
| 0 | — | — | (6) | [3] | (4), [3] | — | — | (6) | [3] | 4 |
| 1 | — | — | (7), [6], [3] | (4), [3] | — | — | — | (7), (6), [3] | (4), [3] | — |
| 2 | — | — | (8), 7, 4, 6, [3] | — | — | — | — | (8), 7, 4, 6, [3] | — | — |
| 3 | — | — | 7, 6, (11), [5], [4], [3] | (6), (5), [3] | (5), (4), [3] | — | — | — | — | — |
| 4 | — | — | (12), 8, 7, 11, [5], [4], [3], [6] | (6), (5), (4), (7), [3] | — | — | — | — | — | — |
| 5 | — | — | (13), 12, 9, 8, 7, 5, 4, 11, 6, [3] | — | — | — | — | — | — | — |
| 6 | — | — | (7), [3], [6] | (7), [3] | (5), [3] | — | — | (7) | (7), [3] | — |

TABLE 5

2 ms minimum latency

| UL-DL Configuration | Subframe n | | | | | | | | | |
|---|---|---|---|---|---|---|---|---|---|---|
| | 0 | 1 | 2 | 3 | 4 | 5 | 6 | 7 | 8 | 9 |
| 0 | — | — | (6), [2] | [2] | (4) | — | — | (6), [2] | [2] | (4) |
| 1 | — | — | (7), (6), [3], [2] | (4), [2] | — | — | — | (7), (6), [3], [2] | (4), [2] | — |
| 2 | — | — | (8), (7), 4, 6, [3],[2] | — | — | — | — | (8), (7), 4, 6, [3], [2] | — | — |
| 3 | — | — | 7, 6, (11), [5], [4], [3], [2] | (6), (5), [2] | (5), (4) | — | — | — | — | — |
| 4 | — | — | (12), 8, 7, (11), [5], [4], [3], [2], [6] | [2] | — | — | — | — | — | — |
| 5 | — | — | (13), (12), 9, 8, 7, 5, 4, 11, 6, [3], [2] | — | — | — | — | — | — | — |
| 6 | — | — | (7), [3], [2] | (7), [2] | (5) | — | — | (7), [2] | (7), [2] | — |

Thus, as shown in Table 4 (3 ms minimum latency), for UL-DL configuration 2, subframe 2, the PUCCH (HARQ feedback) resources may be assigned in the following order (for earlier transmitted DL subframes): 8, 7, 4, 6, 3, 2: (Note that multiple PUCCH/HARQ resources may be available corresponding to each DL subframe):

1) Subframe n−8 (normal-latency mode only)—PUCCH/HARQ resources 1
2) Subframe n−7 (normal-latency mode only)—PUCCH/HARQ resources 2
3) Subframe n−4 (both normal-latency mode and low-latency mode)—PUCCH/HARQ resources 3
4) Subframe n−6 (both normal-latency mode and low-latency mode)—PUCCH/HARQ resources 4
5) Subframe n−3 (low-latency mode only)—PUCCH/HARQ resources 5
6) Subframe n−2 (low-latency mode only)—PUCCH/HARQ resources 6

Note, with reference to Table 4, for normal-latency mode user devices, the order or PUCCH/HARQ resource assignment is the same in Tables 4/5 as it is in Table 1. The order of assignment of PUCCH/HARQ resources for DL subframes n−8, n−7, n−4, n−6 does not change in Tables 4/5 (as compared to Table 1) from perspective of normal-latency mode user device (PUCCH/HARQ resources are still assigned in the order 8, 7, 4, 6). HARQ resources have been assigned in the UL subframe for the normal-latency mode DL subframes, HARQ/PUCCH resources are then assigned, beginning with the highest subframe offset index of the low-latency mode DL subframe (e.g., HARQ resources 5 is allocated (or reserved) for HARQ feedback for DL subframe n−6, followed by HARQ resources 6 is allocated (or reserved) for HARQ feedback for DL subframe n−3).

One further aspect may include that the starting point for the PUCCH region for the HARQ feedback of DL subframes belonging to Group 2 may be different from the starting point of Group 1A/1B subframes.

One or more example implementations may include one or more of the following illustrative advantages:
- The example implementations facilitate significant latency reduction in TDD operation with minimal changes to BS and no changes to normal latency mode user device operation
- One or more of the example implementations may be backwards compatible→resource collisions with normal-latency mode user devices are avoided completely
- One or more example implementations may reduce the PUCCH resource space and hence the UL overhead.

This is because, in some situations (e.g., DL subframes for normal-latency mode and low-latency mode) having a same HARQ feedback offset), HARQ resources may be shared by both a low-latency mode user device and a normal-latency mode user device. The PUCCH resources do not need to be dimensioned according to the maximum number of HARQ feedback resources as the unoccupied resources may automatically appear in the end of the PUCCH region.

According to an example implementation, a computer program product includes a computer-readable storage medium and storing executable code that, when executed by at least one data processing apparatus, is configured to cause the at least one data processing apparatus to perform the method of: determining, by a user device, that the user device is a low-latency mode user device; receiving a downlink data block in downlink subframe n; determining a hybrid automatic repeat request (HARQ) feedback for the data block; determining, by the low-latency mode user device, an uplink subframe n+k at a HARQ feedback offset of k subframes from subframe n, and one or more uplink HARQ resources for the uplink subframe n+k reserved for the HARQ feedback from the low-latency mode user device; and transmitting, by the low-latency mode user device, the HARQ feedback via subframe n+k and the one or more uplink HARQ resources.

According to an example implementation, an apparatus may include at least one processor and at least one memory including computer instructions, when executed by the at least one processor, cause the apparatus to: determine, by a user device, that the user device is a low-latency mode user device; receive a downlink data block in downlink subframe n; determine a hybrid automatic repeat request (HARQ) feedback for the data block; determine, by the low-latency mode user device, an uplink subframe n+k at a HARQ feedback offset of k subframes from subframe n, and one or more uplink HARQ resources for the uplink subframe n+k reserved for the HARQ feedback from the low-latency mode user device; and transmit, by the low-latency mode user device, the HARQ feedback via subframe n+k and the one or more uplink HARQ resources.

According to an example implementation of the apparatus, and further causing the apparatus to: determine that one or more first uplink HARQ resources for uplink subframe n+k have been reserved for HARQ feedback from a normal-latency mode user device for a downlink data frame having a HARQ feedback offset that is different than k subframes; wherein the causing the apparatus to determine one or more uplink HARQ resources for the uplink subframe n+k reserved for the HARQ feedback from the low-latency mode user device comprises causing the apparatus to determine one or more second uplink HARQ resources reserved for the HARQ feedback from the low-latency mode user device, wherein the one or more second uplink HARQ resources are different from the one or more first uplink HARQ resources based on a use of a same HARQ feedback offset for both the low-latency mode user device and the normal-latency mode user device.

According to an example implementation of the apparatus, and further causing the apparatus to: determine that one or more first uplink HARQ resources for uplink subframe n+k have been reserved for HARQ feedback from a normal-latency mode user device for a downlink data frame having a HARQ feedback offset that is different than k subframes; and wherein one or more HARQ resources for the low-latency mode user device are mapped to physical uplink control channel (PUCCH) resources with highest indices, starting after the highest indexed HARQ resources mapped to the normal-latency mode user device.

According to an example implementation of the apparatus, and further causing the apparatus to: determine that one or more first uplink HARQ resources for uplink subframe n+k have been reserved for HARQ feedback from a normal-latency mode user device for a downlink data subframe having a HARQ feedback offset that is also k subframes; and determine the one or more first uplink HARQ resources reserved for the HARQ feedback from the low-latency mode user device, wherein the one or more first HARQ resources are shared for HARQ feedback from both the low-latency mode user device and the normal-latency mode user device based on a use of different HARQ feedback offsets for the low-latency mode user device and the normal-latency mode user device.

According to an example implementation of the apparatus, wherein the minimum HARQ feedback offset for the low-latency mode user device is less than a minimum HARQ feedback offset of one or more normal-latency mode user devices.

According to an example implementation of the apparatus, wherein the HARQ resources comprise resources reserved in a physical uplink control channel (PUCCH) for HARQ feedback.

According to an example implementation of the apparatus, wherein causing the apparatus to determine, by the low-latency mode user device, an uplink subframe n+k at a HARQ feedback offset of k subframes comprises causing the apparatus to: determine, by the low-latency mode user device, an uplink subframe n+k at a HARQ feedback offset that satisfies the minimum HARQ feedback offset for the low-latency mode user device from the downlink subframe n.

According to an example implementation of the apparatus, wherein the feedback offset of k subframes for the low-latency mode user device is defined to be at least one of the following: k greater than or equal to 1 subframe; k greater than or equal to 2 subframes; and k greater than or equal to 3 subframes.

According to an example implementation of the apparatus, the user device is operating in a time-division duplex (TDD) mode of operation.

According to another example implementation, an apparatus may include means (e.g., 302A/302B, and/or 304, FIG. 3) for determining, by a user device, that the user device is a low-latency mode user device; receiving a downlink data block in downlink subframe n; means (e.g., 302A/302B, and/or 304, FIG. 3) for determining a hybrid automatic repeat request (HARQ) feedback for the data block; means (e.g., 302A/302B, and/or 304, FIG. 3) for determining, by the low-latency mode user device, an uplink subframe n+k at a HARQ feedback offset of k subframes from subframe n, and one or more uplink HARQ resources for the uplink subframe n+k reserved for the HARQ feedback from the low-latency mode user device; and means (e.g., 302A/302B, and/or 304, FIG. 3) for transmitting, by the low-latency mode user device, the HARQ feedback via subframe n+k and the one or more uplink HARQ resources.

Figure 3:
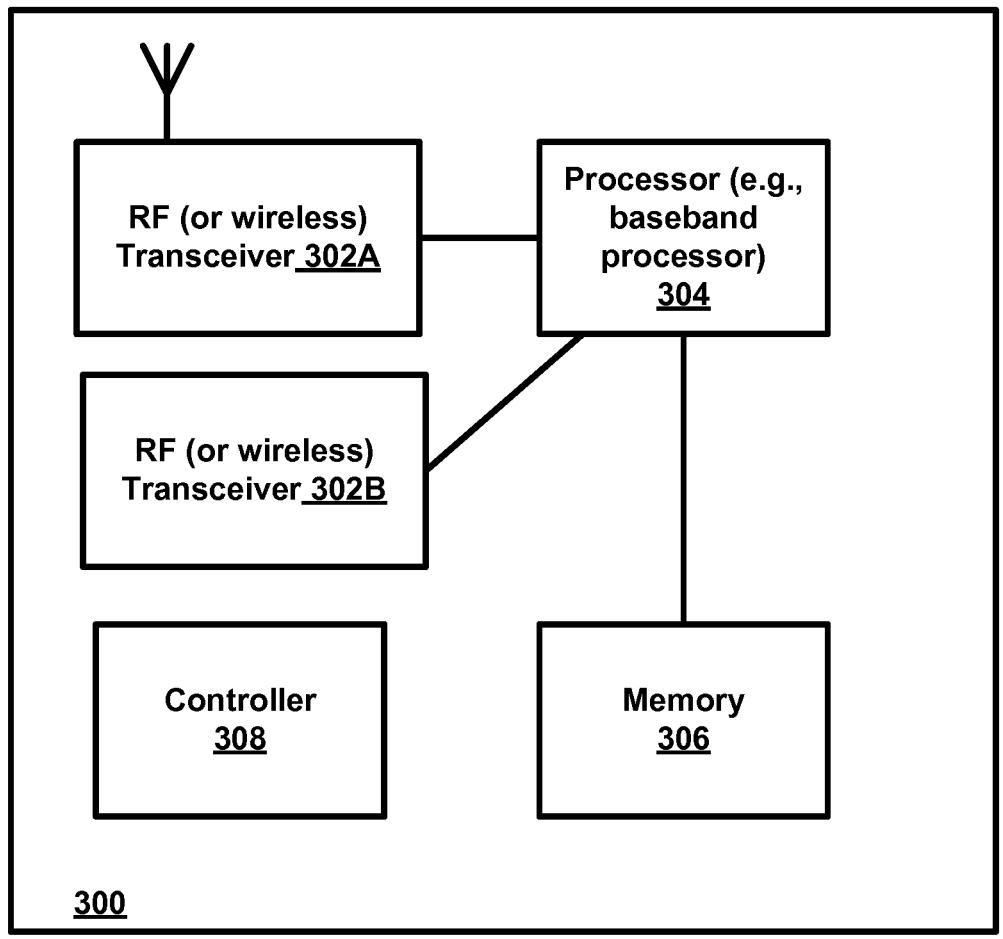
FIG. 3 is a block diagram of a node or wireless station (e.g., base station/access point or mobile station/user device/UE) according to an example implementation.

FIG. 3 is a block diagram of a wireless station (e.g., AP or user device) 300 according to an example implementation. The wireless station 300 may include, for example, one or two RF (radio frequency) or wireless transceivers 302A, 302B, where each wireless transceiver includes a transmitter to transmit signals and a receiver to receive signals. The wireless station also includes a processor or control unit/entity (controller) 304 to execute instructions or software and control transmission and receptions of signals, and a memory 306 to store data and/or instructions.

Processor 304 may also make decisions or determinations, generate frames, packets or messages for transmission, decode received frames or messages for further processing, and other tasks or functions described herein. Processor 304, which may be a baseband processor, for example, may generate messages, packets, frames or other signals for transmission via wireless transceiver 302 (302A or 302B). Processor 304 may control transmission of signals or messages over a wireless network, and may control the reception of signals or messages, etc., via a wireless network (e.g., after being down-converted by wireless transceiver 302, for example). Processor 304 may be programmable and capable of executing software or other instructions stored in memory or on other computer media to perform the various tasks and functions described above, such as one or more of the tasks or methods described above. Processor 304 may be (or may include), for example, hardware, programmable logic, a programmable processor that executes software or firmware, and/or any combination of these. Using other terminology, processor 304 and transceiver 302 together may be considered as a wireless transmitter/receiver system, for example.

In addition, referring to FIG. 3, a controller (or processor) 308 may execute software and instructions, and may provide overall control for the station 300, and may provide control for other systems not shown in FIG. 3, such as controlling input/output devices (e.g., display, keypad), and/or may execute software for one or more applications that may be provided on wireless station 300, such as, for example, an email program, audio/video applications, a word processor, a Voice over IP application, or other application or software.

In addition, a storage medium may be provided that includes stored instructions, which when executed by a controller or processor may result in the processor 304, or other controller or processor, performing one or more of the functions or tasks described above.

According to another example implementation, RF or wireless transceiver(s) 302A/302B may receive signals or data and/or transmit or send signals or data. Processor 304 (and possibly transceivers 302A/302B) may control the RF or wireless transceiver 302A or 302B to receive, send, broadcast or transmit signals or data.

The embodiments are not, however, restricted to the system that is given as an example, but a person skilled in the art may apply the solution to other communication systems. Another example of a suitable communications system is the 5G concept. It is assumed that network architecture in 5G will be quite similar to that of the LTE-advanced. 5G is likely to use multiple input-multiple output (MIMO) antennas, many more base stations or nodes than the LTE (a so-called small cell concept), including macro sites operating in co-operation with smaller stations and perhaps also employing a variety of radio technologies for better coverage and enhanced data rates.

It should be appreciated that future networks will most probably utilise network functions virtualization (NFV) which is a network architecture concept that proposes virtualizing network node functions into "building blocks" or entities that may be operationally connected or linked together to provide services. A virtualized network function (VNF) may comprise one or more virtual machines running computer program codes using standard or general type servers instead of customized hardware. Cloud computing or data storage may also be utilized. In radio communications this may mean node operations may be carried out, at least partly, in a server, host or node operationally coupled to a remote radio head. It is also possible that node operations will be distributed among a plurality of servers, nodes or hosts. It should also be understood that the distribution of labour between core network operations and base station operations may differ from that of the LTE or even be non-existent.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device or in a propagated signal, for execution by, or to control the operation of, a data processing apparatus, e.g., a programmable processor, a computer, or multiple computers. Implementations may also be provided on a computer readable medium or computer readable storage medium, which may be a non-transitory medium. Implementations of the various techniques may also include implementations provided via transitory signals or media, and/or programs and/or software implementations that are downloadable via the Internet or other network(s), either wired networks and/or or wireless networks. In addition, implementations may be provided via machine type communications (MTC), and also via an Internet of Things (IOT).

The computer program may be in source code form, object code form, or in some intermediate form, and it may be stored in some sort of carrier, distribution medium, or computer readable medium, which may be any entity or device capable of carrying the program. Such carriers include a record medium, computer memory, read-only memory, photoelectrical and/or electrical carrier signal, telecommunications signal, and software distribution package, for example. Depending on the processing power needed, the computer program may be executed in a single electronic digital computer or it may be distributed amongst a number of computers.

Furthermore, implementations of the various techniques described herein may use a cyber-physical system (CPS) (a system of collaborating computational elements controlling physical entities). CPS may enable the implementation and exploitation of massive amounts of interconnected ICT devices (sensors, actuators, processors microcontrollers, . . . ) embedded in physical objects at different locations. Mobile cyber physical systems, in which the physical system in question has inherent mobility, are a subcategory of cyber-physical systems. Examples of mobile physical systems include mobile robotics and electronics transported by humans or animals. The rise in popularity of smartphones has increased interest in the area of mobile cyber-physical systems. Therefore, various implementations of techniques described herein may be provided via one or more of these technologies.

A computer program, such as the computer program(s) described above, can be written in any form of programming language, including compiled or interpreted languages, and can be deployed in any form, including as a stand-alone program or as a module, component, subroutine, or other unit or part of it suitable for use in a computing environment. A computer program can be deployed to be executed on one computer or on multiple computers at one site or distributed across multiple sites and interconnected by a communication network.

Method steps may be performed by one or more programmable processors executing a computer program or computer program portions to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer, chip or chipset. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in, special purpose logic circuitry.

To provide for interaction with a user, implementations may be implemented on a computer having a display device, e.g., a cathode ray tube (CRT) or liquid crystal display (LCD) monitor, for displaying information to the user and a user interface, such as a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the true spirit of the various embodiments.

What is claimed is:

1. A method comprising:
    determining, by a user device, that the user device is a low-latency mode user device;
    receiving a downlink data block in downlink subframe n;
    determining a hybrid automatic repeat request (HARQ) feedback for the downlink data block;
    determining, by the low-latency mode user device, an uplink subframe n+k at a HARQ feedback offset of k subframes from subframe n, a minimum HARQ feedback offset for the low-latency mode user device being less than a minimum HARQ feedback offset of one or more normal-latency mode user devices,
    one or more first uplink HARQ resources for the uplink subframe n+k reserved for the HARQ feedback from the low-latency mode user device,
    one or more second uplink HARQ resources for the uplink subframe n+k reserved for the HARQ feedback from a normal-latency mode user device,
    one or more third uplink HARQ resources for the uplink subframe n+k reserved for the HARQ feedback from both the low-latency mode user device and the normal-latency mode user device, and
    the one or more uplink HARQ resources being selected from one of the first uplink HARQ resources and the third uplink HARQ resources based on the HARQ feedback offset and a minimum latency; and
    transmitting, by the low-latency mode user device, the HARQ feedback via subframe n+k and the one or more uplink HARQ resources.

2. The method of claim 1, comprising:
    determining that one or more first uplink HARQ resources for uplink subframe n+k have been reserved for HARQ feedback from a normal-latency mode user device for a downlink data frame having a HARQ feedback offset that is different than k subframes;
    wherein the determining one or more uplink HARQ resources for the uplink subframe n+k reserved for the HARQ feedback from the low-latency mode user device comprises determining one or more second uplink HARQ resources reserved for the HARQ feedback from the low-latency mode user device, wherein the one or more second uplink HARQ resources are different from the one or more first uplink HARQ resources based on a use of a same HARQ feedback offset for both the low-latency mode user device and the normal-latency mode user device.

3. The method of claim 1, comprising:
    determining that one or more first uplink HARQ resources for uplink subframe n+k have been reserved for HARQ feedback from a normal-latency mode user device for a downlink data frame having a HARQ feedback offset that is different than k subframes; and
    wherein one or more HARQ resources for the low-latency mode user device are mapped to physical uplink control channel (PUCCH) resources with highest indices, starting after the highest indexed HARQ resources mapped to the normal-latency mode user device.

4. The method of claim 1, comprising:
    determining that one or more first uplink HARQ resources for uplink subframe n+k have been reserved for HARQ feedback from a normal-latency mode user device for a downlink data subframe having a HARQ feedback offset that is also k subframes; and
    determining the one or more first uplink HARQ resources reserved for the HARQ feedback from the low-latency mode user device, wherein the one or more first HARQ resources are shared for HARQ feedback from both the low-latency mode user device and the normal-latency mode user device based on a use of different HARQ feedback offsets for the low-latency mode user device and the normal-latency mode user device.

5. The method of claim 1 wherein the determining one or more uplink HARQ resources comprises:

determining one or more uplink HARQ resources based on a predefined table.

6. The method of claim 1 wherein the HARQ resources comprise resources reserved in a physical uplink control channel (PUCCH) for HARQ feedback.

7. The method of claim 1 wherein determining, by the low-latency mode user device, an uplink subframe n+k at a HARQ feedback offset of k subframes comprises:
determining, by the low-latency mode user device, an uplink subframe n+k at a HARQ feedback offset that satisfies the minimum HARQ feedback offset for the low-latency mode user device from the downlink subframe n.

8. The method of claim 1, wherein the HARQ feedback offset of the k subframes for the low-latency mode user device being at least one of k greater than or equal to 1 subframe, k greater than or equal to 2 subframes, and k greater than or equal to 3 subframes.

9. An apparatus comprising at least one processor and at least one memory including computer instructions, when executed by the at least one processor, cause the apparatus to:
determine, by a user device, that the user device is a low-latency mode user device;
receive a downlink data block in downlink subframe n;
determine a hybrid automatic repeat request (HARQ) feedback for the downlink data block;
determine, by the low-latency mode user device,
an uplink subframe n+k at a HARQ feedback offset of k subframes from subframe n, a minimum HARQ feedback offset for the low-latency mode user device being less than a minimum HARQ feedback offset of one or more normal-latency mode user devices, and
one or more first uplink HARQ resources for the uplink subframe n+k reserved for the HARQ feedback from the low-latency mode user device,
one or more second uplink HARQ resources for the uplink subframe n+k reserved for the HARQ feedback from a normal-latency mode user device,
one or more third uplink HARQ resources for the uplink subframe n+k reserved for the HARQ feedback from both the low-latency mode user device and the normal-latency mode user device, and
the one or more uplink HARQ resources being selected from one of the first uplink HARQ resources and the third uplink HARQ resources based on the HARQ feedback offset and a minimum latency; and
transmit, by the low-latency mode user device, the HARQ feedback via subframe n+k and the one or more uplink HARQ resources.

10. The apparatus of claim 9 and further causing the apparatus to:
determine that one or more first uplink HARQ resources for uplink subframe n+k have been reserved for HARQ feedback from a normal-latency mode user device for a downlink data frame having a HARQ feedback offset that is different than k subframes;
wherein the causing the apparatus to determine one or more uplink HARQ resources for the uplink subframe n+k reserved for the HARQ feedback from the low-latency mode user device comprises causing the apparatus to determine one or more second uplink HARQ resources reserved for the HARQ feedback from the low-latency mode user device, wherein the one or more second uplink HARQ resources are different from the one or more first uplink HARQ resources based on a use of a same HARQ feedback offset for both the low-latency mode user device and the normal-latency mode user device.

11. The apparatus of claim 9 and further causing the apparatus to:
determine that one or more first uplink HARQ resources for uplink subframe n+k have been reserved for HARQ feedback from a normal-latency mode user device for a downlink data frame having a HARQ feedback offset that is different than k subframes; and
wherein one or more HARQ resources for the low-latency mode user device are mapped to physical uplink control channel (PUCCH) resources with highest indices, starting after the highest indexed HARQ resources mapped to the normal-latency mode user device.

12. The apparatus of claim 9 and further causing the apparatus to:
determine that one or more first uplink HARQ resources for uplink subframe n+k have been reserved for HARQ feedback from a normal-latency mode user device for a downlink data subframe having a HARQ feedback offset that is also k subframes; and
determine the one or more first uplink HARQ resources reserved for the HARQ feedback from the low-latency mode user device, wherein the one or more first HARQ resources are shared for HARQ feedback from both the low-latency mode user device and the normal-latency mode user device based on a use of different HARQ feedback offsets for the low-latency mode user device and the normal-latency mode user device.

13. The apparatus of claim 9:
wherein the HARQ resources comprise resources reserved in a physical uplink control channel (PUCCH) for HARQ feedback.

14. The apparatus of claim 9 wherein causing the apparatus to determine, by the low-latency mode user device, an uplink subframe n+k at a HARQ feedback offset of k subframes comprises causing the apparatus to:
determine, by the low-latency mode user device, an uplink subframe n+k at a HARQ feedback offset that satisfies the minimum HARQ feedback offset for the low-latency mode user device from the downlink subframe n.

15. The apparatus of claim 9 wherein the user device is operating in a time-division duplex (TDD) mode of operation.

16. The apparatus of claim 9, wherein the HARQ feedback offset of the k subframes for the low-latency mode user device being at least one of k greater than or equal to 1 subframe, k greater than or equal to 2 subframes, and k greater than or equal to 3 subframes.

* * * * *